(No Model.)  3 Sheets—Sheet 1.

R. H. & W. F. SMITH.
MEANS FOR GAS DISTRIBUTION

No. 342,143.  Patented May 18, 1886.

Witnesses  Inventors
Chas. W. Davis  R. H. Smith
W. D. Alexander  Wm. F. Smith
 By their Attorney
 C. W. Alexander (No Model.) 3 Sheets—Sheet 2.

R. H. & W. F. SMITH.
MEANS FOR GAS DISTRIBUTION

No. 342,143. Patented May 18, 1886.

Witnesses
Chas. D. Davis
W. D. Alexander

Inventors
R. H. Smith and W. F. Smith
By their Attorney
C. M. Alexander (No Model.) 3 Sheets—Sheet 3.

R. H. & W. F. SMITH.
MEANS FOR GAS DISTRIBUTION

No. 342,143. Patented May 18, 1886.

Witnesses
Chas. W. Davis
W. S. Alexander

Inventors
R. H. Smith and W. F. Smith
By Their Attorney
C. M. Alexander

UNITED STATES PATENT OFFICE.

ROLAND H. SMITH AND WILLIAM F. SMITH, OF PITTSBURG, PENNSYLVANIA.

MEANS FOR GAS-DISTRIBUTION.

SPECIFICATION forming part of Letters Patent No. 342,143, dated May 18, 1886.

Application filed December 9, 1885. Serial No. 185,154. (No model.)

*To all whom it may concern:*

Be it known that we, ROLAND H. SMITH and WILLIAM F. SMITH, citizens of the United States, residing at Pittsburg, in the county of Allegheny and State of Pennsylvania, have invented certain new and useful Improvements in Gas-Distribution, of which the following is a specification, reference being had therein to the accompanying drawings.

This invention has for its objects to provide for the detection of leakage in underground gas-mains for conveying either natural or artificial gas at any point along the line, whether at the joints or the sections between the joints, without the necessity of removing the earth above the line of pipes, and thus disturbing the surface of the street or roadway beneath which the pipes are laid. These objects we attain by the means illustrated in the accompanying drawings, in which—

Figure 1:
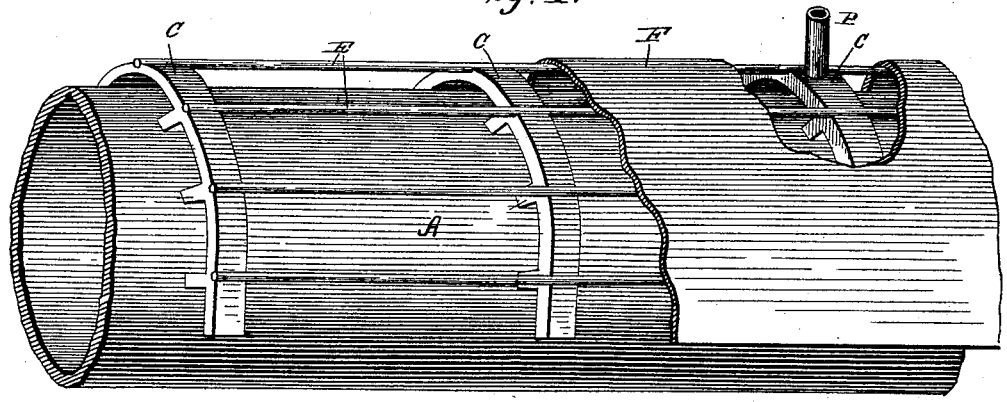
Figure 2:
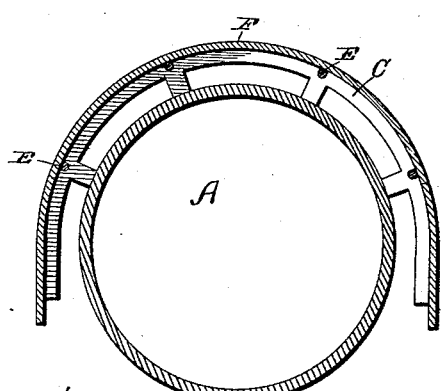
Figure 3:
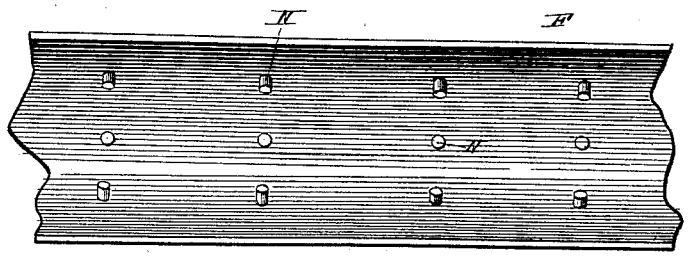
Figure 4:
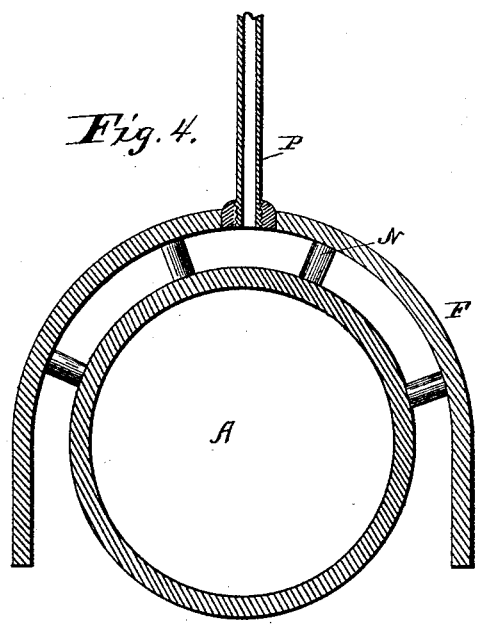
Figure 5:
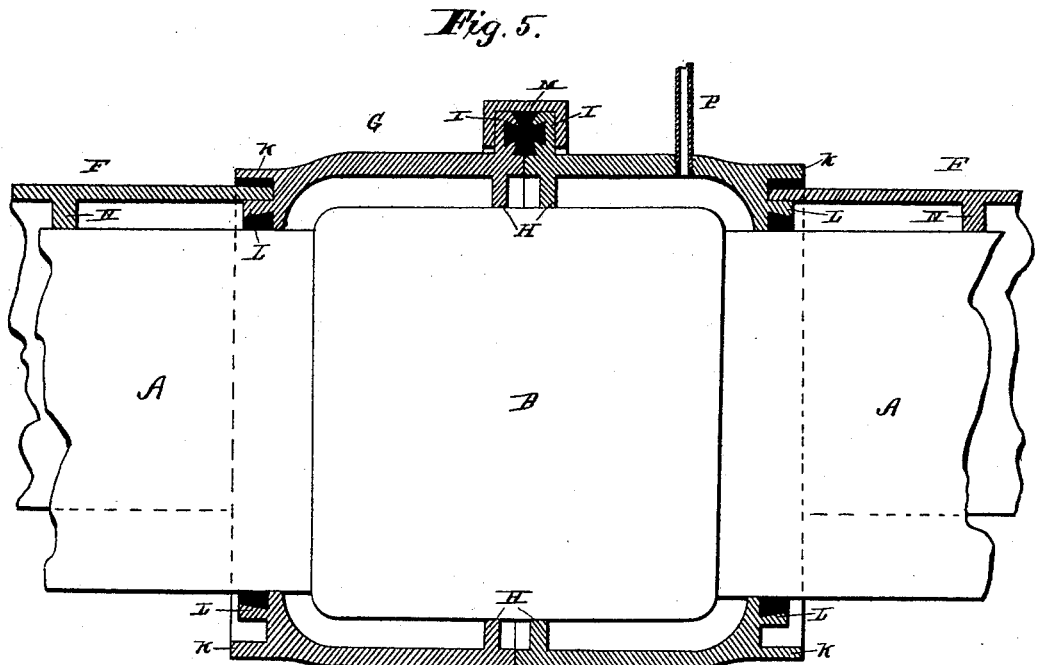
Figure 6:
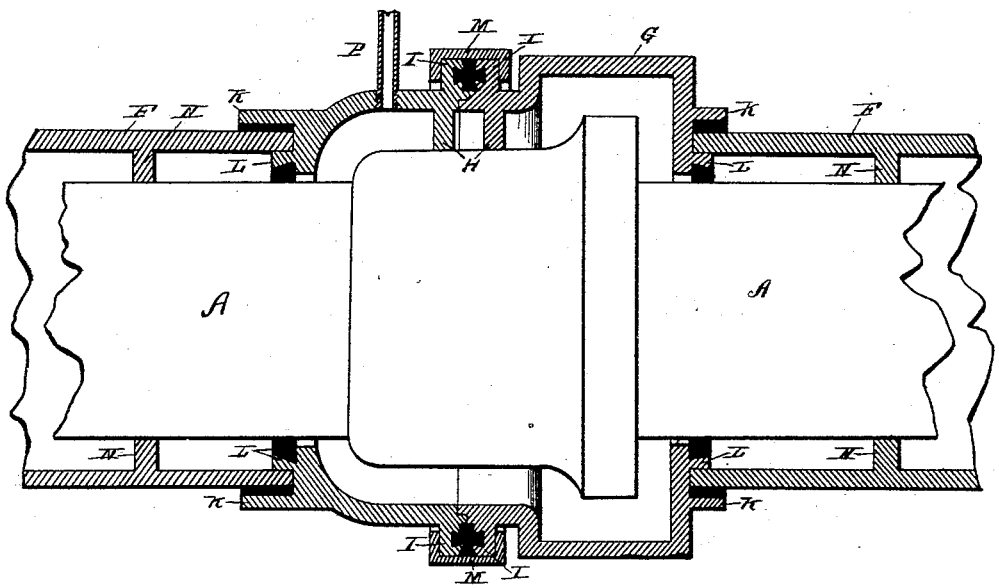
Figure 7:
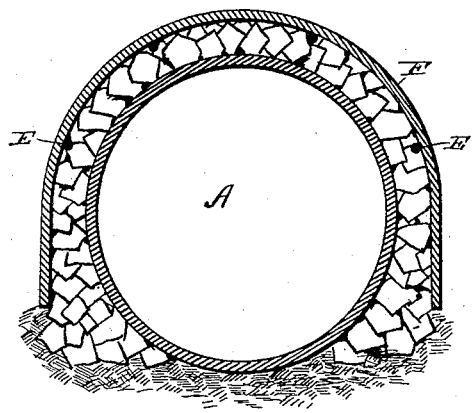

Figure 1 represents a perspective view of a portion of a gas-main forming a part of the system and the covering and supports for the same. Fig. 2 represents a transverse vertical sectional view of the same. Fig. 3 represents a plan view of a modification of the covering which is applied to the main; Fig. 4, a transverse vertical sectional view of the main and the said modification of the covering, showing the leakage-tube extending upward therefrom; Fig. 5, a longitudinal sectional view showing the covering at the joint of the sections of the main and the leakage-tube extending from the same; Fig. 6, a similar view showing a modification of the joint-covering as applied to cast-metal sections; and Fig. 7, an end view of one of the sections, showing the covering extending over the main and the filling between the said cover and main.

The letter A indicates the main, which consists of a pipe of wrought or cast iron, and B, Fig. 5, the section-coupling employed in the case of a wrought-iron main.

C indicates a series of annular saddles, which are made in segmental sections and provided with ribs on their concave sides, so arranged as to fit upon the outside of the main, leaving spaces between their concave sides and the outside of the main. The convex sides of said saddles are provided with transverse grooves, forming seats for the longitudinal bars E, which, with the saddles, are designed to support the covering F of the main, which consists of a cylindrical pipe which is made in sections, and which may be constructed of light sheet-iron, tarred paper, or any other suitable material.

The letter G indicates the coupling employed to connect the sections of the covering. The said coupling is constructed of cast-iron in two sections, having lugs H and flanges I on the outer and inner portions near their adjoining edges. Each of the adjoining faces of the outer flanges I is provided with a recess having the shape of the half of a Maltese cross, so that when the two sections are placed together a recess in the shape of a Maltese cross will be formed, which may be filled with a suitable calking material, which will interlock the sections and form a gas-tight joint.

The ends opposite the flanged ends above described are formed with recesses K L, for the reception of the ends of the main and cover sections and the calking material necessary to make a tight joint.

The letter M indicates a series of clamps, which are applied over the outer flanges of the coupling-sections to securely hold the same together.

From the covering, at suitable intervals, are extended suitable leakage-tubes, P, to the surface of the ground above the line, for the escape of the gas leaking from the pipes and the detection of the points of leakage without removing the earth. Between the longitudinal bars resting upon the saddles the space may be filled in with broken stone or bricks, which will form an additional support for the covering. The coupling-sections forming the cover are provided with internal ribs similar to the sections covering the main sections, so as to leave a space around the coupling-joints of the main.

In the modification shown in Figs. 3 and 4 the covering is constructed of cast-iron with lugs or projections N, which rest upon the outside of the main, so as to leave the necessary space around it.

Having thus described our invention, what we claim, and desire to secure by Letters Patent, is—

1. The combination, with the mains, of the saddles provided with ribs resting thereon, and having transverse grooves on the outside, and the longitudinal bars supporting the covering, substantially as specified.

2. The combination, with the main section and covering-sections, of the coupling-sections, flanged at their adjoining edges and having interlocking recess in the shape of a Maltese cross for holding the calking material, substantially as specified.

3. The combination, with the main and covering sections, of the coupling-sections having recesses at the ends for the reception of the ends of the main and covering sections and the calking material, substantially as specified.

4. The combination, with the main sections, the saddles, and the supporting-bars and cover, of the filling of broken stone or brick or other suitable material, forming an additional support for the covering, substantially as specified.

5. The combination of the main and covering sections and the joint-cover sections, constructed in two parts and connected together, as described, the main and cover sections being calked in recesses in the joint-sections, substantially as specified.

6. A pipe-covering constructed of cast metal or other suitable material and arranged to partly cover the pipes and fully cover the joints, substantially as specified.

In testimony whereof we affix our signatures in presence of two witnesses.

ROLAND H. SMITH.
WM. F. SMITH.

Witnesses:
D. P. BLACK,
SAUL W. BLACK.